No. 653,998. Patented July 17, 1900.
C. B. HATFIELD.
CORN SHIELD.
(Application filed Mar. 7, 1900.)

(No Model.)

UNITED STATES PATENT OFFICE.

CHARLES B. HATFIELD, OF NEW YORK, N. Y.

CORN-SHIELD.

SPECIFICATION forming part of Letters Patent No. 653,998, dated July 17, 1900.

Application filed March 7, 1900. Serial No. 7,644. (No model.)

*To all whom it may concern:*

Be it known that I, CHARLES B. HATFIELD, a citizen of the United States, residing at New York city, in the county of New York and State of New York, have invented certain new and useful Improvements in Corn-Shields; and I do hereby declare the following to be a full, clear, and exact description of the invention, such as will enable others skilled in the art to which it appertains to make and use the same.

The present invention relates to an improved corn and bunion shield; and it has for its object to produce a device of this character in which the cushioning-protector shall be greatly improved, and, further, to greatly improve the means for applying a medicinal compound to the corn or bunion.

To the above ends the present invention consists of the improved corn and bunion shield which will be hereinafter described and claimed.

The present invention is shown in the accompanying drawings, wherein is illustrated in a somewhat-enlarged form a corn-shield embodying the same, and in which—

Figure 1:
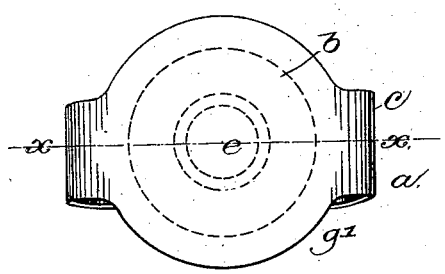
Figure 2:
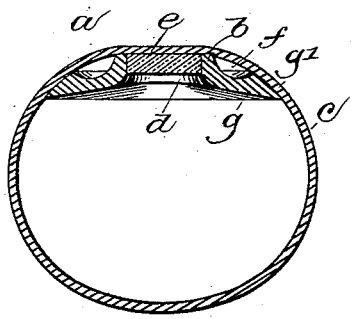
Figure 3:
Figure 4:
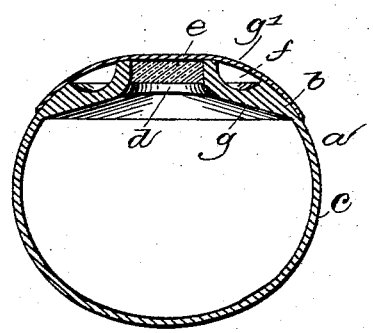

Figure 1 shows a top plan view; Fig. 2, a vertical section taken on dotted line $x$ $x$, Fig. 1. Fig. 3 shows in side elevation the medicated disk removed, and Fig. 4 shows a vertical section illustrating a modification.

Similar letters of reference will be employed to designate corresponding parts.

In the drawings, $a$ represents the device as a whole, which comprises a cushioning-protector $b$ and a retaining-band $c$, which encircles the toe and retains the cushioning-protector in position. The cushioning-protector $b$ is preferably formed circular in shape, and upon its under surface is provided with a circular recess $d$, into which is fitted a removable disk $e$, formed of some suitable soft and yielding absorbent material, such as felt, lint, or absorbent cotton. It is designed that several of the medicated disks be furnished with each shield, whereby the shield may be used for an indefinite length of time by simply removing the old disk and substituting a fresh one or whereby disks having a different character of medicinal substance may be used. Thus for a day or so the shield may be used with a disk saturated with an acid to soften the corn and permit its removal, after which a disk provided with a healing salve or ointment may be substituted to remove the soreness. The shield is formed of rubber, and to improve the cushioning properties of the cushioning-protector it is provided with an air-chamber $f$, which preferably surrounds the opening or recess $d$, thus forming an air-cushion around the corn, greatly relieving the corn from the pressure of the shoe and stocking. The air-chamber $f$ may be formed in any of the well-known ways of molding and shaping articles from rubber, a convenient way being shown in the drawings, wherein the cushioning-protector $b$ is formed of two parts, the under part $g$, which is substantially an annulus, having a groove formed in its upper surface, over which is secured the upper part $g'$ by cement or in any other suitable manner. The part $g'$ closes the groove and confines the air therein, thus forming the air-chamber, and also closes the recess $d$, which receives the medicated disk. The band $c$ may be formed integral with the part $g'$, or it may be formed with the part $g$, as shown in Fig. 4. Besides greatly improving the cushioning effect of the cushioning-protector by forming therein the air-chamber it will be observed that by providing the device with a removable medicated pad the usefulness thereof is greatly increased.

I am aware that it has been proposed to provide a corn or bunion shield with a medicinal compound in the form of a salve or other ointment; but in such devices the salve or ointment has been found to be objectionable in that it dissolved or melted and spread over and soiled the sock or stocking, whereas in the present invention it is held by the absorbent removable disk.

Having described my invention, I claim as new and desire to protect by Letters Patent of the United States—

1. A corn or bunion shield comprising a rubber cushioning-protector and an elastic retaining band or ring, the cushioning-protector being formed of an annulus having a groove formed in its upper surface surrounding the central opening, and a cover extending over the central opening and the groove, forming a recess on the under side of the protector, and a closed air-chamber around the recess, substantially as described.

2. A corn or bunion shield comprising a rubber cushioning-protector and an elastic retaining band or ring, the cushioning-protector having a central recess upon its under side and a closed air-chamber surrounding said recess, and a removable medicated fibrous pad in said recess, substantially as described.

In testimony whereof I affix my signature in presence of two witnesses.

CHARLES B. HATFIELD.

Witnesses:
T. HART ANDERSON,
CHRISTIANA KITCHING.